UNITED STATES PATENT OFFICE.

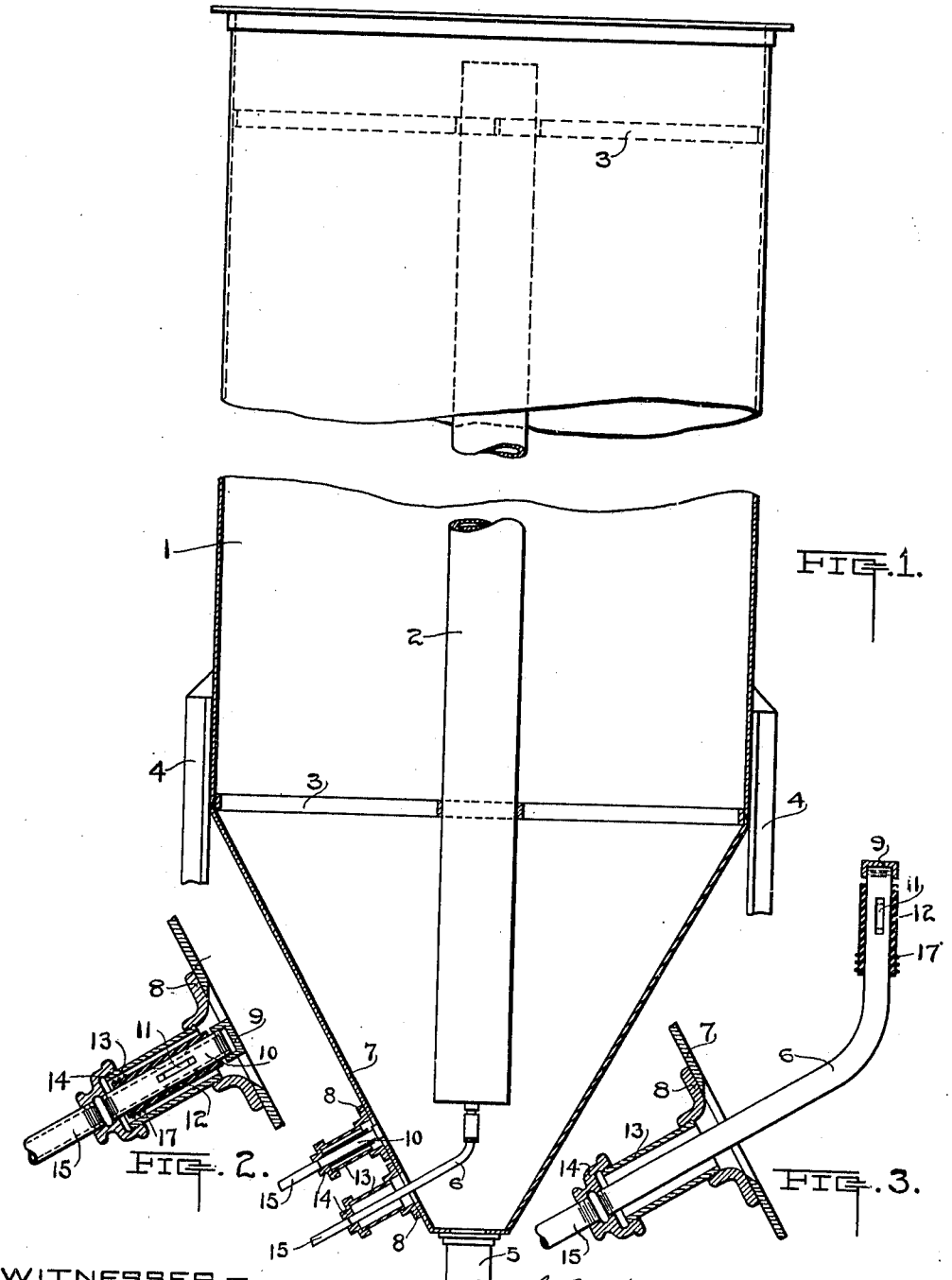

LOUIS T. SICKA, OF MILWAUKEE, WISCONSIN, ASSIGNOR TO ALLIS-CHALMERS COMPANY, OF MILWAUKEE, WISCONSIN, A CORPORATION OF NEW JERSEY.

AGITATOR.

978,667. Specification of Letters Patent. Patented Dec. 13, 1910.

Application filed May 3, 1909. Serial No. 493,651.

*To all whom it may concern:*

Be it known that I, LOUIS T. SICKA, a citizen of the United States, residing at Milwaukee, in the county of Milwaukee and State of Wisconsin, have invented certain new and useful Improvements in Agitators, of which the following is a specification.

This invention relates to improvements in the construction of agitators.

The object of the invention is to provide a simple and effective injection nozzle for use in connection with agitator tanks in which air or other fluid is injected up under the material to be agitated.

A clear conception of the invention can be obtained by referring to the accompanying drawings in which like reference characters designate the same parts in different views.

Figure 1 is a fragmentary and partly sectional view of an agitator tank with the invention applied thereto. Fig. 2 is an enlarged section through the short nozzles. Fig. 3 is a similar section through the long nozzles.

The tank 1 having the conical bottom 7 is supported by the braces 4, and has a pipe 2 suspended within its walls. The pipe 2 is held concentric with the tank 1 by radial rods 3 extending from the walls of the tank 1. The lower portion of the conical bottom 7 is provided with a discharge pipe 5.

The nozzles 6, 10, at the ends of the air inlets 15, are directed upwardly at the bottom 7 of the tank 1, the lower and longer nozzle 6 extending into the tank 1 and being directed into the pipe 2. The upper or short nozzle 10 does not extend within the walls of the bottom 7. There may be any number of these nozzles 6, 10, depending upon the class of material under treatment, the arrangement of all being similar to that of the two nozzles 6, 10, which are shown.

The ends of the pipes 15 are screwed into the connections 14 at one end, the nozzles 6, 10, being screwed into the opposite ends. The nipples 13, which surround the lower portions of the nozzles 6, 10, are in turn fastened to the connections 14 and to the flanges 8 which are fastened to the tank bottom 7 all these fastenings being of usual construction. The connections 14, nipples 13, and flanges 8 form pockets or recesses at the points where the nozzles 6, 10, enter the bottom 7.

The short nozzle 10 is constructed of a short pipe, one end of which is closed by a cap 9, the other end being screwed into the connection 14. This nozzle 10 does not extend beyond the inner surface of the tank bottom 7, the nozzle 10 lying wholly within the recess formed by the connection 14, the nipple 13, and the flange 8. The pipe forming nozzle 10 is perforated by a series of openings 11 which are larger at the outer surface of the pipe. A piece of rubber tubing 12 is placed over the pipe forming the nozzle 6, and is fastened to said pipe at its lower end by the cords 17.

The longer nozzle 6 projects from the recess formed by the connection 14, the nipple 13, and the flange 8, to a point within the tank 1 just below the pipe 2. The upper portion of the pipe forming this nozzle 6 is arranged the same as that of the nozzle 10.

In operating the agitator, the material to be treated is placed into the tank 1 and air or other fluid under pressure is admitted to the pipes 15. This air will pass through the openings 11 in the nozzles 6, 10, and will press the rubber tubes 12 outward. As the air passes from the unattached end of the tubes 12 it expands outwardly in all directions.

If the pressure is cut off within the nozzles 6, 10, the pressure of the material above the nozzles 6, 10, will act against the outer surfaces of tubes 12 and thus prevent the passage of any of the material into the nozzles 6, 10. In this way the nozzles 6, 10, serve as check valves accommodating a flow in only one direction.

The short nozzles 10 are recesses within the tank walls so that the downward sliding of any solid matter upon the bottom 7 will not tend to injure the nozzles 10. These short nozzles 10 are not necessary during the normal operation of the agitator, their primary purpose being to break up any solid masses at the bottom of the tank 1 when starting the agitator.

It should be understood that it is not desired to be limited to the exact details of construction shown and described, for obvious modifications will occur to a person skilled in the art.

It is claimed and desired to secure by Letters Patent:

1. The combination in an agitator, of a tank, a nozzle applied to said tank, a pocket on said tank at said nozzle, said pocket forming a recess entirely within which the nozzle is located, and a check valve within said pocket and controlling said nozzle.

2. The combination in an agitator, of a tank, a pipe connected to said tank and a check valve in said pipe at its connection to said tank and free from projection within said tank.

In testimony whereof, I affix my signature in the presence of two witnesses.

L. T. SICKA.

Witnesses:
G. F. DE WEIN,
H. C. CASE.